(12) United States Patent
Wixey

(10) Patent No.: US 7,683,635 B1
(45) Date of Patent: Mar. 23, 2010

(54) ADJUSTABLE SENSOR STRIP FOR LINEAR DIGITAL READOUTS

(76) Inventor: Barry Douglas Wixey, 5306 Umbrella Pool Rd., Sanibel, FL (US) 33957

( * ) Notice: Subject to any disclaimer, the term of this patent is extended or adjusted under 35 U.S.C. 154(b) by 182 days.

(21) Appl. No.: 11/895,402

(22) Filed: Aug. 24, 2007

Related U.S. Application Data

(60) Provisional application No. 60/839,863, filed on Aug. 24, 2006.

(51) Int. Cl.
*G01R 27/26* (2006.01)
(52) U.S. Cl. .................................. 324/662; 324/663
(58) Field of Classification Search .............. 324/662, 324/663
See application file for complete search history.

(56) References Cited

U.S. PATENT DOCUMENTS

| | | | | |
|---|---|---|---|---|
| 5,744,379 | A * | 4/1998 | Mandai et al. | ................. 438/59 |
| 6,928,872 | B2 * | 8/2005 | Durante et al. | ........... 73/504.04 |

* cited by examiner

*Primary Examiner*—Amy He
(74) *Attorney, Agent, or Firm*—William E. Noonan

(57) ABSTRACT

An adjustable sensor strip assembly for use with a digital readout includes a plurality of sensor strip segments and a plurality of readout tracks for supporting the sensor strip segments. The readout tracks are fastened together with a wedge assembly. An alignment gauge is used to align the adjoining sensor strip segments so that precise measurements are achieved.

13 Claims, 6 Drawing Sheets

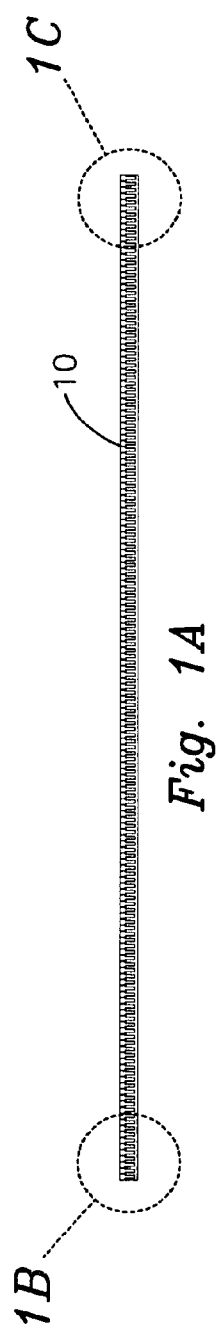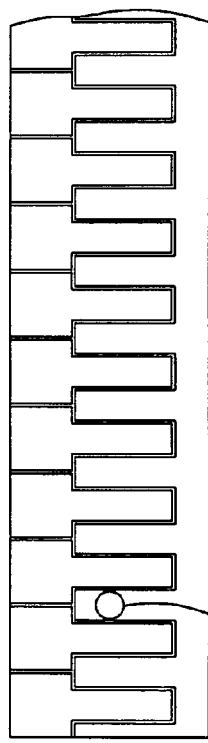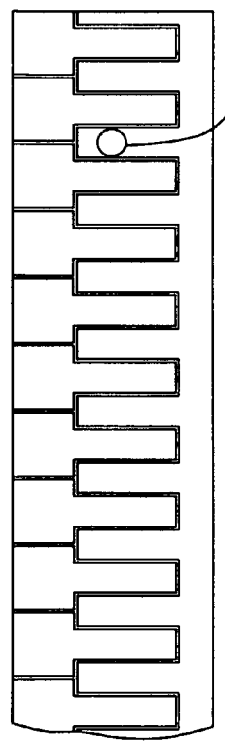

ADJUSTABLE SENSOR STRIP FOR LINEAR DIGITAL READOUTS

RELATED APPLICATION

This application claims the benefit of U.S. Provisional Patent Application Ser. No. 60/839,863 filed Aug. 24, 2006.

FIELD OF THE INVENTION

This invention relates to a capacitive sensor strip featuring short sections that can be easily joined together accurately by a novice. Also disclosed is a technique for joining the strips onto a long track or onto short sections of track that are joined together accurately.

BACKGROUND OF THE INVENTION

It is common for electronic linear digital measuring systems which use capacitive technology to use a sensor strip with a repeating metallic pattern to provide the feedback signal to the readout. This sensor strip is typically made from an FR4 fiberglass material which has a copper or other metallic film deposited on the surface. This metallic surface is then accurately etched to provide the proper pattern for processing the measurement signal.

The FR4 type of material is preferred because of its stable characteristics in regards to temperature, humidity and physical handling. The drawback of using this material is that it is currently only manufactured in short lengths of about 48" long. This limits the maximum length to be measured to something less than 48". It is possible to carefully connect several pieces of this material to make longer systems; however, presently this connection must be down at the factory level using complex and time consuming methods to insure the accuracy.

SUMMARY OF THE INVENTION

It is therefore an object of the present invention to provide an adjustable sensor strip assembly that permits multiple sensor strips of standard length to be connected together quickly, conveniently and precisely so that accurate measurements can be obtained for lengths and distances that exceed the length of a standard sensor strip (e.g. forty-eight inches).

It is a further object of this invention to provide a system for assembling an extremely accurate oversized capacitive sensor strip that does not require complicated and time consuming factory manufacture, but rather which can be assembled quickly, conveniently and simply, as required, by a layman or other user of the strip.

It is a further object of this invention to provide an adjustable sensor strip assembly that enables a digital readout to conveniently and accurately measure lengths in excess of forty-eight inches and which is especially effective for use on table saws and other machines where long horizontal distances must be measured.

This invention features an adjustable capacitor sensor strip for use with a digital readout device. The strip includes a plurality of separate, distinct, elongate sensor segments that are alignable with one another in a generally end-to-end manner and are releasably interconnected in the aligned condition.

In a preferred embodiment, the strips are carried by a readout track that may include one or multiple track segments. Each segment includes an elongate channel. The track segments are interconnected such as by a fastening wedge and the strip segments are received in aligned channels of the tracks. The strip segments are primarily aligned and positioned by an alignment gauge. The gauge may include pins having a predetermined spacing. The pins are engaged with respective alignment holes formed in the strip segments.

DETAILED DESCRIPTION OF PREFERRED EMBODIMENTS

Other objects, features and advantages will occur from the following description of a preferred embodiment and the accompanying drawings, in which:

FIG. 1A is an elevational front view of a representative sensor strip segment utilized in this invention;

FIG. 1B is an elevational plan view of the left-hand end of the sensor strip segment;

FIG. 1C is an elevational plan view of the right-hand end of the sensor strip segment;

There is shown in FIG. 1A a capacitive sensor strip segment 10 that is intended for use in the adjustable sensor strip assembly of this invention. Sensor strip segment 10 is manufactured in a generally conventional manner. The strip has an elongate shape and is made from an FR4 fiberglass material, which has a copper or other metallic film deposited on the surface. The metallic surface is etched to provide a pattern for processing a measurement signal that is detected by a conventional digital readout device mounted for movement along the strip. The etchings are depicted in the upper surface of strip segment 10. This particular segment has a length of 31.39 inches. Conventionally, sensor strips are usually manufactured in lengths of 48 inches or less. This limits the use of such strips for taking measurements on machines where measurements larger than 48 inches are required.

Strip segment 10 is modified in accordance with this invention by providing the strip segment with a left-hand alignment hole 12, FIG. 1B and a right-hand alignment hole 14, FIG. 1C. Alignment holes 12 and 14 are placed at precisely predetermined locations proximate the respective ends of strip segment 10. In alternative embodiments, multiple alignment holes may be placed proximate each end of the sensor strip segments. These alignment holes allow adjoining strip segments to be spaced apart a proper distance and held in place when the adjoining strip segments are interconnected in a manner described more fully below. The alignment holes include precisely machined tolerances which may vary within the scope of the invention. Holes 12, 14 extend through the entire thickness of the sensor strip.

Figure 2:
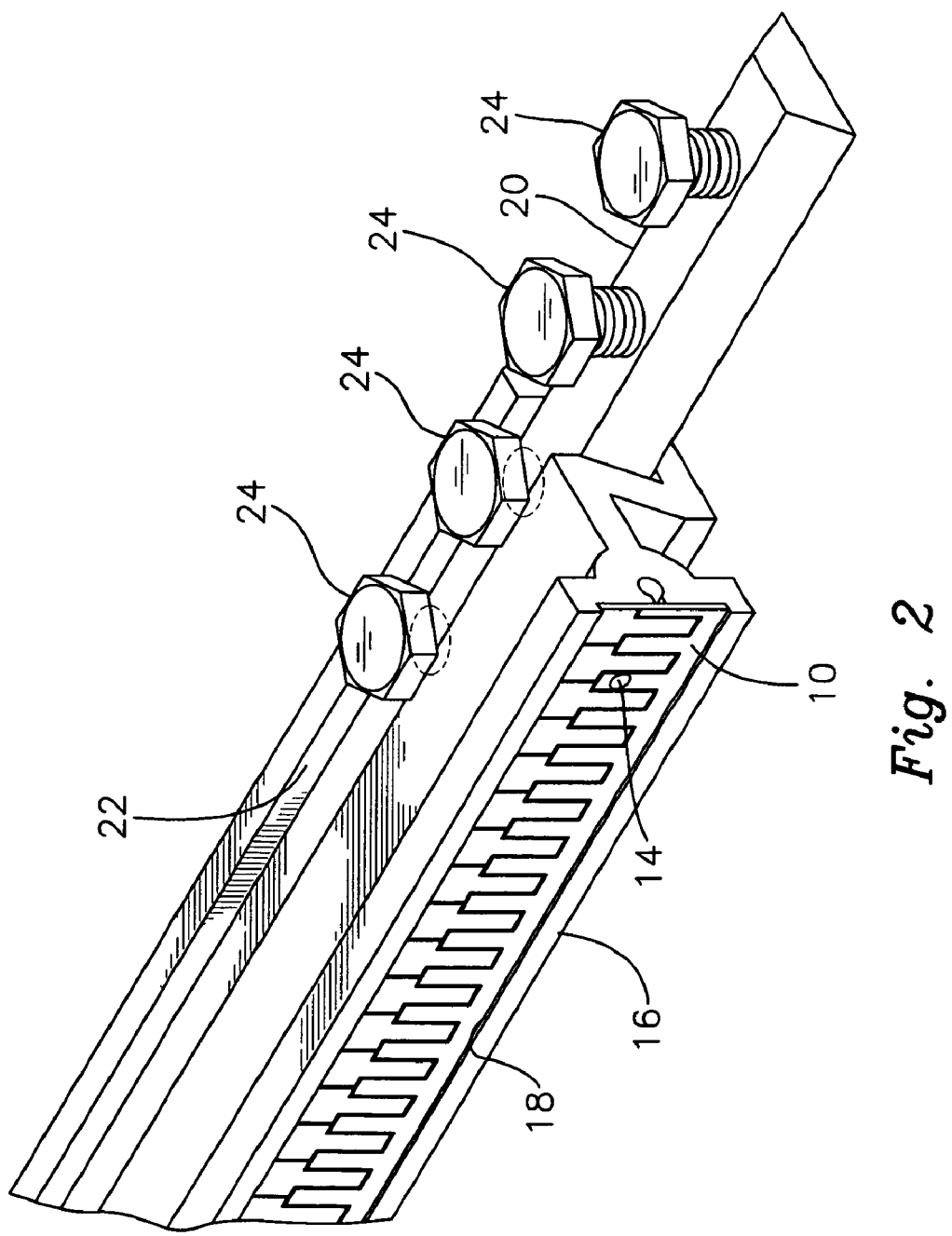
FIG. 2 is a perspective view of the strip segment received in the channel of a readout track segment; a fastening wedge apparatus for connecting a pair of adjoining track segments is also illustrated.

As shown in FIG. 2, sensor strip segment 10 is supported in an elongate readout track segment 16. Track segment 16 allows a digital readout to move operatively along the track segment so that measurements can be taken in a conventional manner. The track segment includes a longitudinal channel 18 that receives sensor strip 10.

In accordance with the present invention, an extended or oversized sensor strip is assembled by interconnecting a plurality of aligned readout track segments and respective sensor strips supported thereby. Adjoining readout track segments are interconnected by a fastening wedge 20. In FIG. 2, wedge 20 is shown partially received in dovetail slot 22 of track segment 16. Wedge 20 has a shape that corresponds to that of the dovetail slot 22. A plurality of fastening bolts 24 are formed through respective openings in wedge 20. The bolts are tightened to secure the wedge in position within slot 22 of track segment 16.

Figure 3:
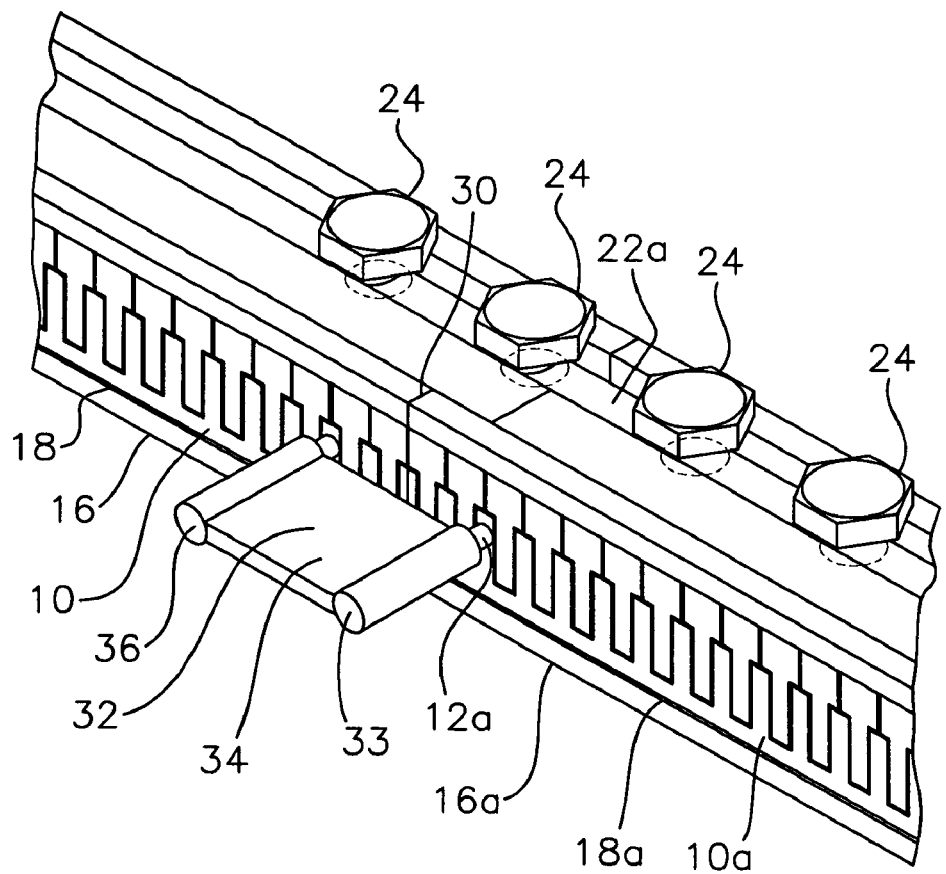
FIG. 3 is a perspective view of an assembled readout track including a pair of adjoining track segments that carry respective sensor strips; the track fastening wedge and alignment gauge are also shown.

A second track segment 16*a* is shown attached to track segment 16 in FIG. 3. Track segment 16*a* likewise includes a longitudinal channel 18*a* that receives a second capacitive sensor strip segment 10*a*. Strip segment 10*a* is manufactured in an identical or very similar manner to segment 10. In particular, the outer surface of the strip segment is etched for operatively cooperating with a digital readout that is mounted to slide along the supportive track segment. Strip segment 10*a* also includes left-hand and right-hand alignment openings as previously described. Left-hand alignment opening 12*a* is shown in FIG. 3.

Track segments 16 and 16*a* and their respective supported strip segments 10 and 10*a* are assembled in the following manner. Initially, before the sensor strip segments are installed, wedge 20 is inserted into slot 22 of track segment 16 in the manner shown in FIG. 2. Track segment 16*a* is then aligned with segment 16 and wedge 20 is inserted into the slot 22*a* of track segment 16*a* such that the track segments abut along line 30 as shown in FIG. 3. Before this interconnection is made, the abutting ends of the track segments 16 and 16*a* should be filed to provide for a smooth transition for the digital readout that is to be mounted on the assembled track. Bolts 24 are then tightened to secure the individual track segments together to define the assembled track.

After the track segments are joined, the sensor strip segments 10,10*a* are inserted into their respective channels 18 and 18*a*. In particular, the right edge of sensor strip 10 is aligned with line 30 and sensor strip segment 10 is pressed into channel 18.

Figure 4:
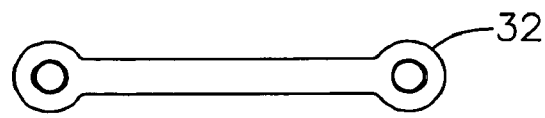
FIG. 4 is an elevational front view of the alignment gauge.
Figure 5:
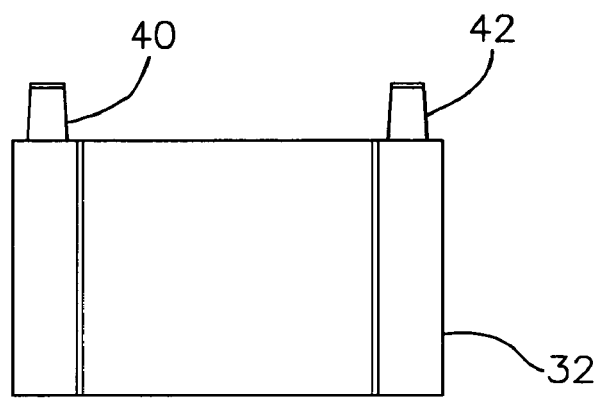
FIG. 5 is a top plan view of the alignment gauge.
Figure 6:
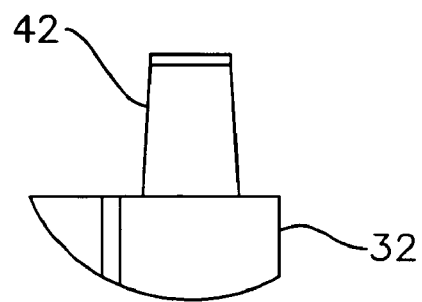
FIG. 6 is a fragmentary view of one of the pins in the alignment gauge.

An alignment gauge 32 is utilized to properly position second sensor strip segment 10*a* on track segment 16*a*. Gauge 32, shown alone in FIGS. 4-6, includes a body 34 that features a pair of side barrels 36 and 38. Each barrel carries a respective alignment pin 40 and 42 that extends from one end thereof. The alignment pins are spaced apart by a precisely predetermined distance. Each pin is engagable with a respective alignment hole proximate the ends of the abutting sensor strips 10 and 10*a*. The pins of the gauge are engaged with respective holes 14 and 12 such that the adjoining sensor strips 10 and 10*a* are precisely aligned and have a predetermined spacing. This allows accurate measurements to be taken by the digital readout mounted on the track and operatively cooperating with the adjoining and aligned sensor strip segments. As a result, sensor strip segments 10 and 10*a* form an extended or oversized sensor strip that can significantly exceed the length of standard sensor strips which are factory manufactured. Two or more sensor strips can be joined in the foregoing manner so that distances of 48 inches to over 80 inches may be precisely measured.

Figure 7:
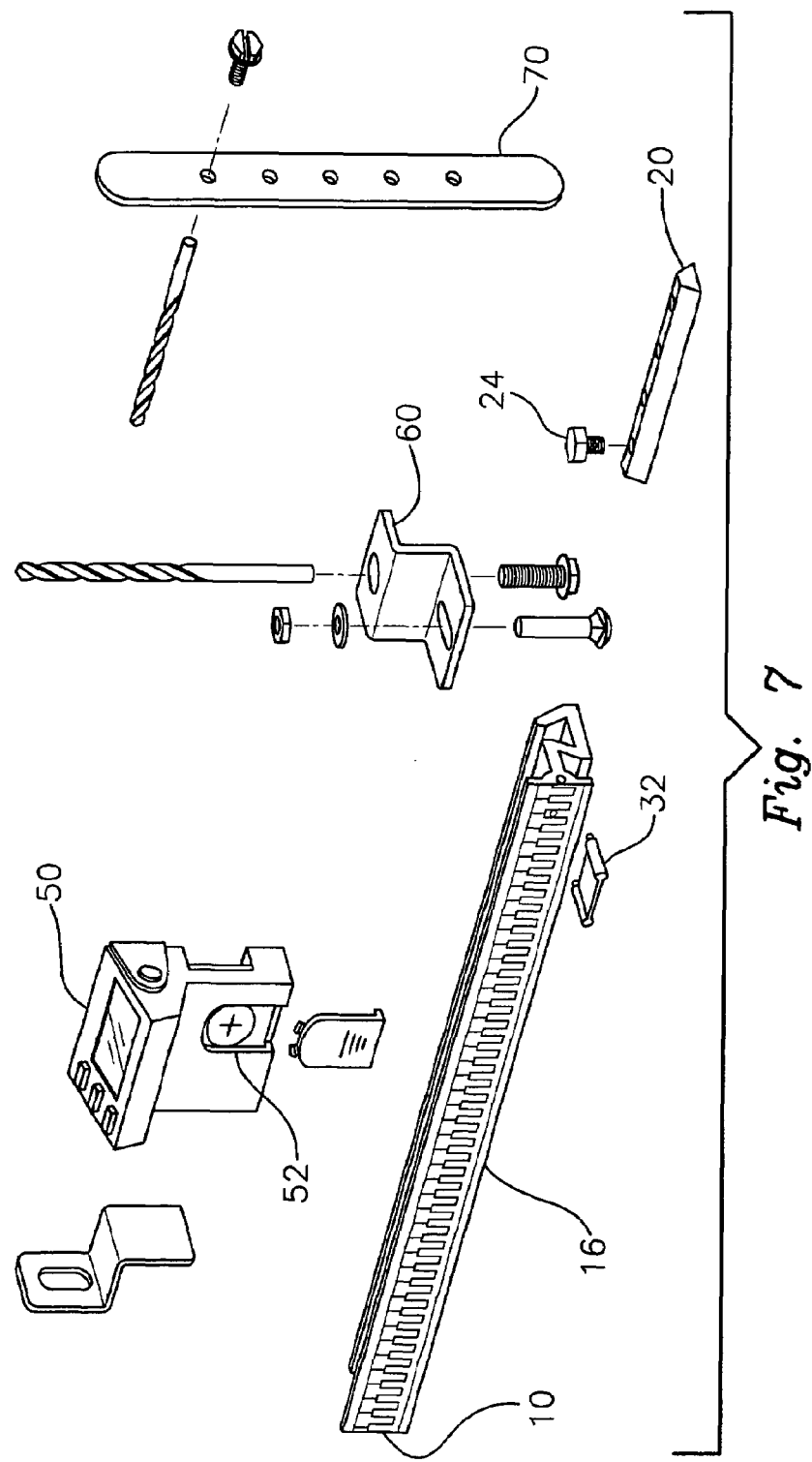
FIG. 7 is a perspective exploded view of a kit employing the adjustable sensor strip of the invention.

FIG. 7 depicts an adjustable sensor strip assembly kit in accordance with this invention. The kit may include a pair of readout tracks 16. Each track carries a respective sensor strip 10. The tracks and aligned strips are joined in the manner previously described by the fastening wedge 20 and bolts 24 (only one of which is shown). The track alignment gauge 32 is utilized to properly position and space the attached sensor strip segments.

Figure 8:
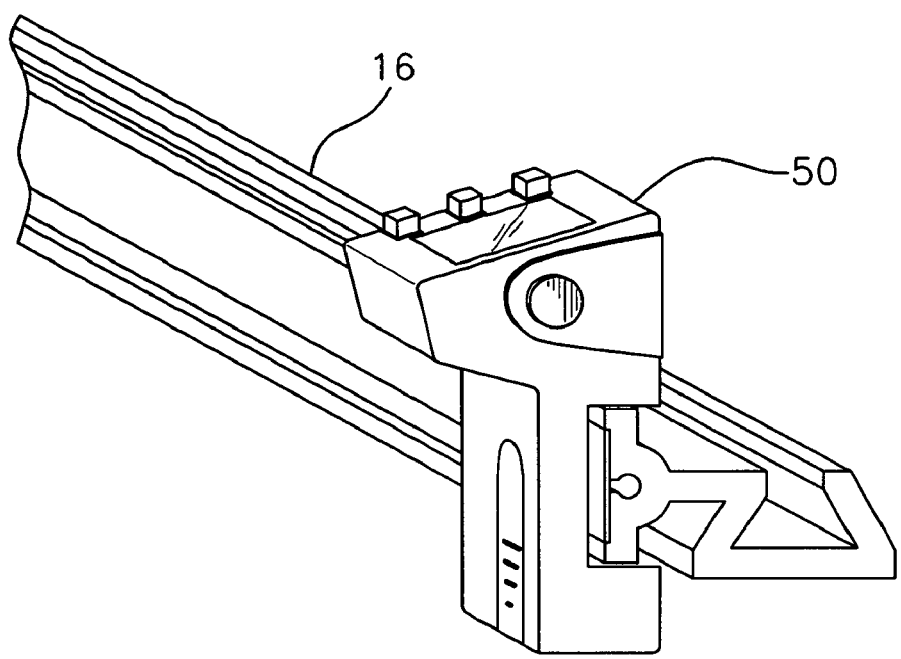
FIG. 8 is a perspective view of the sensor strip assembly with a readout mounted thereon.

A digital readout 50, which is powered by a battery 52, is mounted for movement along the attached track segments as best shown in FIG. 8. Digital readout 50 is designed to operate cooperatively with the aligned sensor strip segments and to take linear measurements in a conventional manner.

FIG. 7 further depicts various components that allow the assembled readout track to be attached to a particular tool on which measurements are being taken. In particular, the track may be attached by Z-shaped mounting brackets, for example, to the fence rail of a table saw. Alternatively, a magnet bracket 70 may be used to secure the readout track to the machine. Various alternative methods may be used to fasten the readout track to the machine. Such means of attachment will be understood to persons skilled in the art.

The adjustable sensor strip assembly of this invention is particularly advantageous for use on large table saws where measurements of 54 inches to over 80 inches may be required. The adjustable sensor strip assembly may also be used on milling machines and other machinery where long horizontal distances must be measured. Such machinery may include, for example, miter saw cutoff stations.

It should be understood that in alternative embodiments various other means may be utilized for aligning the ends of the track segments and sensor strip segments. For example, the alignment gauge may employ 2 pins proximate each end and 2 complementary alignment holes may be formed proximate each end of each sensor strip segment. In some versions, a single readout track may be used to support multiple sensor strip segments, which are releasably connected by one or more alignment guides as described above.

The invention is particularly effective for achieving measurements in excess of 48 inches using a digital readout. Factory assembly of oversized sensor strips is not required. Instead, multiple shorter strips may be quickly and conveniently assembled on site by a layman machinist, woodworker or other user of the assembly.

From the foregoing it may be seen that the apparatus of this invention provides for a capacitive sensor strip so featuring short sections can be easily joined together accurately by a novice. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

1. An adjustable capacitive sensor strip assembly for use in cooperation with a digital readout device, said strip assembly comprising:
   a plurality of separate and distinct elongate capacitive sensor segments, which segments are alignable in a substantially end-to-end manner and releasably interconnected to define a capacitive sensor strip; and
   an elongate track having a longitudinal channel formed therein for receiving said sensor strip, the digital readout device being mounted movably on said track for operatively cooperating with said sensor strip.

2. The assembly of claim 1 in which said track includes a plurality of elongate track segments that are alignable in a substantially end-to-end manner and releasably interconnected to one another, each track segment including a longitudinal channel segment for receiving a respective sensor segment therein, said channel segments being aligned when said track segments are interconnected to hold said sensor segments in an aligned, end-to-end arrangement wherein the digital readout device is able to operatively cooperate with said sensor strip.

3. The assembly of claim 2 in which said track segments include respective connecting slot segments that are alignable in a substantially end-to-end manner when said track segments are aligned to define an elongate connecting slot.

4. The assembly of claim 3 further including a fastening device that interengages the aligned connecting slot segments of said aligned track segments to secure together said multiple aligned track segments.

5. The assembly of claim 4 in which each said connecting slot segment includes a like dovetail configuration and said fastening device, includes a dovetail shaped insert conformably received by said connecting slot and interengaging said aligned track segments.

6. The assembly of claim 5 in which said fastening device further includes at least one locking element that secures said insert in place within said connecting slot to hold said aligned track segments together.

7. The assembly of claim 6 in which said locking element includes a threaded element that engages a respective hole in said insert and is tightened against said track to secure said insert in place within said connecting slot.

8. The assembly of claim 1 further including a gauge for holding a pair of adjoining sensor segments with a predetermined positioning and spacing relative to one another along said track.

9. The assembly of claim 8 in which said gauge includes a pair of spaced apart pins for respectively engaging a first gauge hole formed in one of the sensor segments and a second gauge hole formed in the other sensor segment.

10. A capacitive linear digital measuring system comprising:
    an adjustable capacitive sensor strip assembly including a plurality of separate and distinct elongate capacitive sensor segments, which segments are alignable in a substantially end-to-end manner to define a capacitive sensor strip, and an elongate track having a longitudinal channel formed therein for receiving said aligned sensor segments; and
    a digital readout device mounted movably on said track for operatively cooperating with said sensor strip.

11. The system of claim 10 in which said track includes a plurality of elongate track segments that are alignable in a substantially end-to-end manner and are releasably interconnected to one another, each track segment including an elongate channel for receiving a respective sensor segment therein, said channel segments being aligned when said track segments are interconnected to hold said sensor segments in an aligned, end-to-end arrangement wherein said digital readout device operatively cooperates with said sensor strip.

12. The system of claim 11 in which said track segments include respective connecting slot segments that are alignable in a substantially end-to-end manner when said track segments are aligned to define an elongate connecting slot.

13. The system of claim 10 further including a gauge for holding a pair of adjoining sensor segments with a predetermined positioning and spacing relative to one another along said track.

\* \* \* \* \*